United States Patent [19]

Gorski et al.

[11] Patent Number: 5,800,589
[45] Date of Patent: Sep. 1, 1998

[54] GLASSWARE MAKING MACHINE

[75] Inventors: Richard Alan Gorski, West Suffield; Marty J. Grant, Wethersfield, both of Conn.

[73] Assignee: Emhart Glass Machinery Investments Inc., Wilmington, Del.

[21] Appl. No.: 916,096

[22] Filed: Aug. 21, 1997

[51] Int. Cl.$^6$ .................. C03B 9/40; C03B 11/16
[52] U.S. Cl. ........................... 65/159; 65/160
[58] Field of Search .................. 65/29.1, 158, 159, 65/160, 229

[56] References Cited

U.S. PATENT DOCUMENTS 5,122,179  6/1992  Ciriello et al. ................. 65/158
5,545,244  8/1996  Hwang ........................... 65/160

Primary Examiner—Stanley S. Silverman
Assistant Examiner—Sean Vincent
Attorney, Agent, or Firm—Spencer T. Smith

[57] ABSTRACT

An H-28 machine for forming glass containers comprising a cylindrical timing drum having inner and outer surfaces and a timing cam having a circumferentially extending inner surface for matingly engaging the outer drum surface. A pair of elongated circumferentially extending slots are cut in the timing drum. A slider matingly engages the inner surface of the drum and is held against the outer surface of the timing drum by first and second spring biased studs supported by the slider. A motor driven horizontally extending linear actuator which extends between the timing drum and the slider horizontally displaces the slider to horizontally circumferentially displace the timing cam.

4 Claims, 2 Drawing Sheets

GLASSWARE MAKING MACHINE

The present invention relates to a glassware forming machine, generally referred to as the H-28 machine, which has a plurality of glass forming sections rotating about a vertical central axis. Each section performs the process steps for forming a piece of glassware each complete revolution of the machine.

BACKGROUND OF THE INVENTION

A gob of molten glass is dropped into a blank mold and then pressed into a parison. The parison is held in a neck ring while the blank mold is lowered out of the way by an air cylinder which takes a fixed period of time to complete the displacement. With the blank mold down, the blow mold which includes two parts movable towards and away from each other is closed around the parison to complete the blow mold so that the parison can be blown into the finished piece of glassware. The glassware is in the form of a bottle (referred to as a "moire") with the finish (threaded portion) at the top of the bottle. The final glass product, a drinking glass, for example, is formed by cutting the moire below the finish. The neck ring must then be opened to release the finish portion of the moire so that the process can repeat.

The timing of these functions is controlled by a cylindrical timing drum which has a vertical axis and which supports cams on horizontal timing channels which operate selected valves, switches or mechanisms. U.S. Pat. No. 5,122,179, discloses such a machine wherein a number of cams can be electronically adjusted. The neck ring cam was not one of the cams electronically adjusted in this patent.

OBJECT OF THE INVENTION

It is accordingly an object of the present invention to provide an improved electronically adjustable cam for an H-28 machine.

Other objects and advantages of the present invention will become apparent from the following portion of this specification and from the accompanying drawings which illustrate in accordance with the mandate of the patent statutes a presently preferred embodiment incorporating the principles of the invention.

BRIEF DESCRIPTION OF THE DRAWINGS

Referring to the drawings.

BRIEF DESCRIPTION OF THE PREFERRED EMBODIMENT

Figure 1:
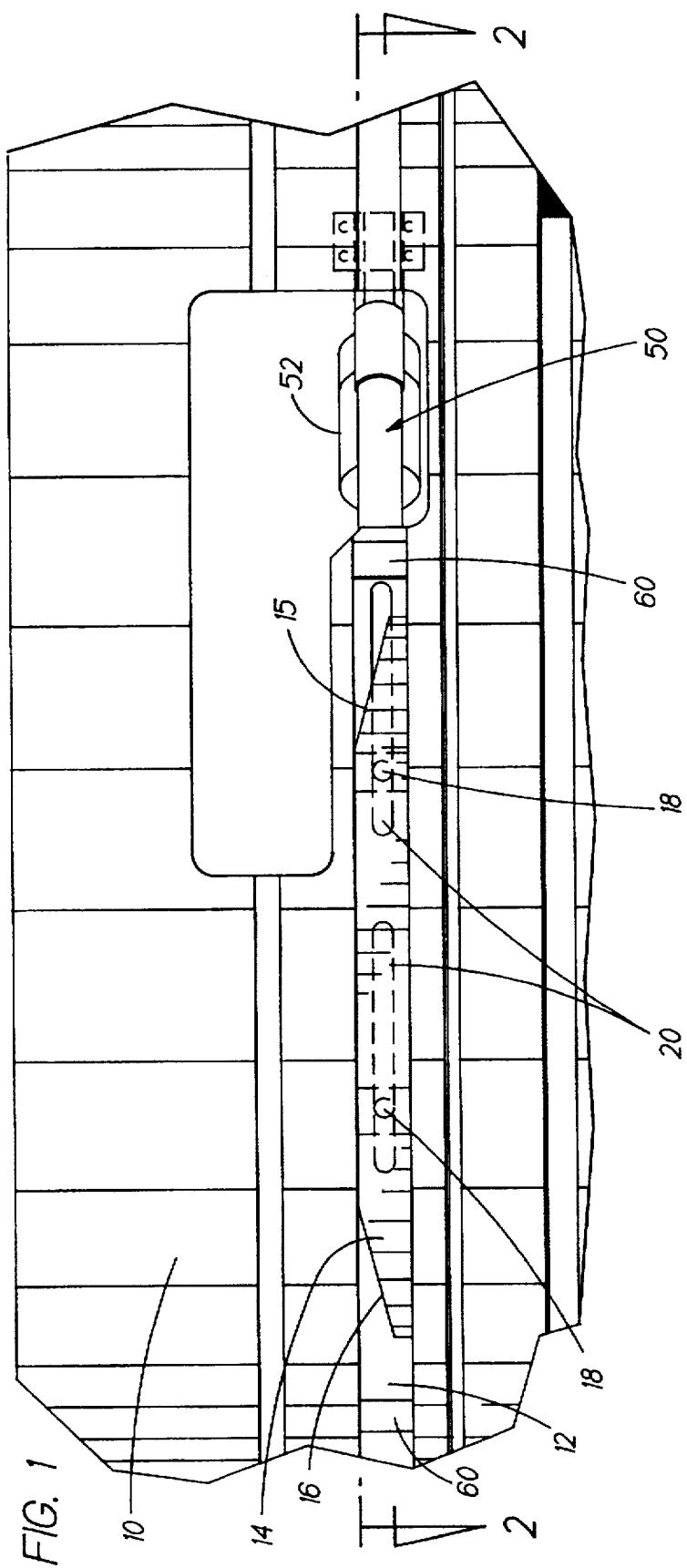
FIG. 1 is a front elevational view of the cylindrical timing drum of an H-28 machine and the neck ring timing cam and the electronically operated cam adjuster.
Figure 2:
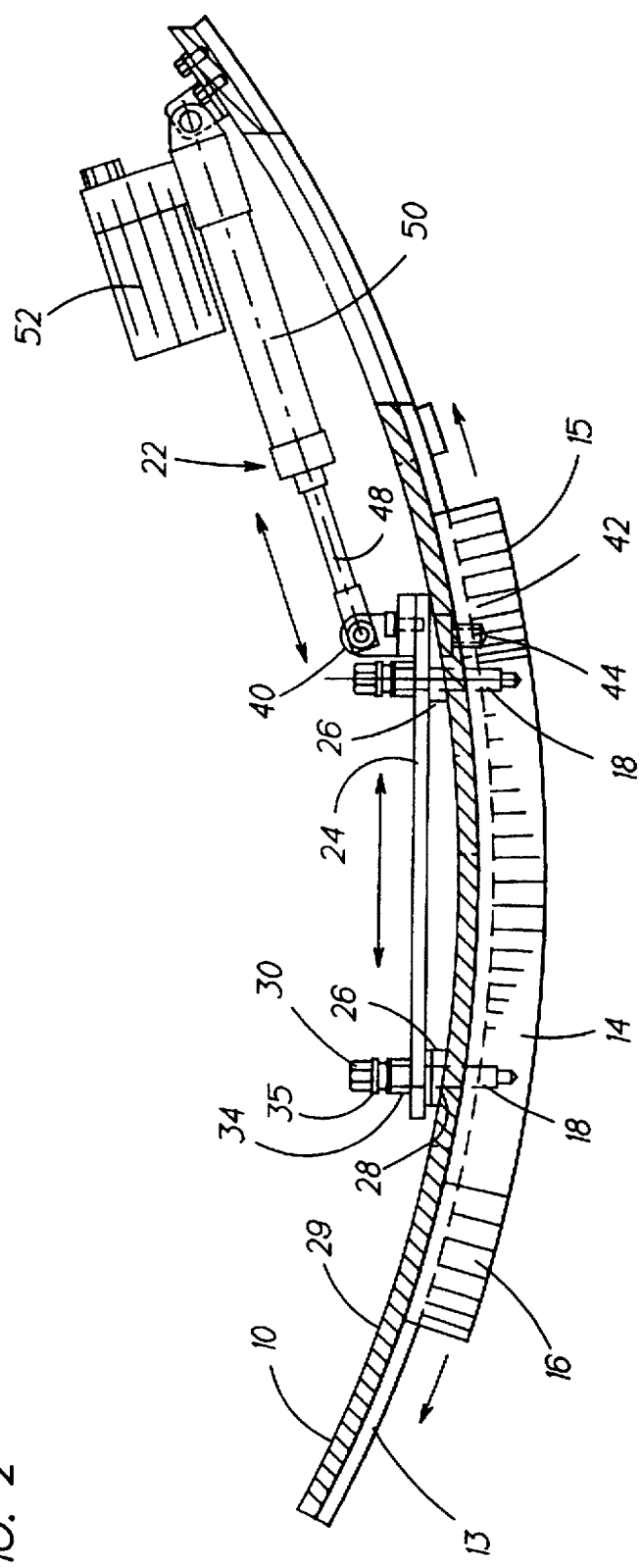
FIG. 2 is a view taken at 2—2 of FIG. 1.

An H-28 machine has a cylindrical timing drum 10 that has a vertical axis. The drum has a circumferentially extending horizontal slot 12 with a depending groove 13 for supporting a cam, here a neck ring cam 14, which also extends horizontally and which has a depending flange for riding in the groove. The cam has lead-in 15 and lead-off 16 surfaces. While the angle through which the cam will operate is fixed, the location of the cam must be changeable to accommodate changes in the process.

Conventionally, the neck ring cam has a bolt at either end which can be inserted into one of a number of matched hole pairs in the drum. In accordance with the present invention, a pair of hold down studs 18 are threadedly secured to the cam at circumferentially spaced locations. The studs extend through circumferentially, horizontally extending slots 20 defined in the drum. The cam is held against the drum by a slider assembly 22 which includes a bracket 24 and pair of pads 26 which have a cylindrical surface 28 for matingly engaging the inner cylindrical surface 29 of the drum. The hold down studs 18 extend through the bracket and terminate with a nut 30. A spring 34 is located on each stud between a washer 35 adjacent the nut and the bracket. To electronically adjust the slider, a cam key 40 is secured to the bracket. The cam key has a drive pin 42 supporting a ball 44 at its end. This cam key also extends through one of the elongated slots. The drive pin is received within a suitable hole in the cam. The end of the cam key remote from the cam pivotally supports the free end of the extendable rod 48 of a linear actuator 50 which is pivotally mounted on the inner surface of the drum. The rod includes a screw portion (not shown) driven by a gear set (not shown) connected to the rotary output (not shown) of an electric motor 52.

When it is desired to adjust the cam, the electric motor will be operated in the correct direction. The motor encoder will supply position data that will be utilized by a controller to define the desired adjustment. If desired, stops 60 can be secured to the outer surface of the drum to limit the adjustment of the cam in either direction.

We claim:

1. A machine which has a plurality of glass forming sections rotating about a vertical central axis with each section forming a glass article each revolution of the machine, comprising a cylindrical timing drum having inner and outer surfaces, a timing cam for controlling the timing of one of the glass article forming functions of a section of the machine, said timing cam having a circumferentially extending inner surface for matingly engaging the outer surface of said drum, a pair of elongated circumferentially extending slots in said timing drum, slider means for matingly engaging the inner surface of said drum for circumferential sliding displacement, means for holding said timing cam against the outer surface of said timing drum including first and second stud means each having a stud supported by said slider means with a portion respectively extending through said first and second slots and secured to said timing cam, and a motor driven horizontally extending linear actuator extending between said timing drum and said slider means for horizontally displacing said slider means to horizontally circumferentially displace said timing cam.

2. A machine for forming glass containers according to claim 1, wherein each of said stud means further includes a nut secured to the end of the stud remote from the timing cam and a spring located on the stud between the nut and said slider means.

3. A machine for forming glass containers according to claim 2, further comprising cam key means for interconnecting said linear actuator and said slider means, said cam key means including a cam key having a portion located within one of said slots.

4. A machine for forming glass containers according to claim 3, wherein said slider means comprises an elongated bracket, and a pair of spaced pads secured to said elongated bracket each including a surface for slidingly engaging the inner surface of said timing drum, each stud extending through said elongated bracket and one of said pads.

* * * * *